(12) United States Patent
Barmettler et al.

(10) Patent No.: US 7,203,940 B2
(45) Date of Patent: Apr. 10, 2007

(54) AUTOMATED INSTALLATION OF AN APPLICATION

(75) Inventors: James W. Barmettler, Corvallis, OR (US); Julian Sessions, Beaverton, OR (US)

(73) Assignee: Hewlett-Packard Development Company, LP., Houston, TX (US)

( * ) Notice: Subject to any disclaimer, the term of this patent is extended or adjusted under 35 U.S.C. 154(b) by 700 days.

(21) Appl. No.: 10/134,766

(22) Filed: Apr. 29, 2002

(65) Prior Publication Data

US 2003/0204843 A1 Oct. 30, 2003

(51) Int. Cl.
G06F 9/445 (2006.01)
(52) U.S. Cl. ..................................................... 717/178
(58) Field of Classification Search ................ 717/178
See application file for complete search history.

(56) References Cited

U.S. PATENT DOCUMENTS

| | | | |
|---|---|---|---|
| 6,052,732 A | | 4/2000 | Gosling |
| 6,078,951 A | | 6/2000 | Pashupathy et al. |
| 6,216,152 B1 | * | 4/2001 | Wong et al. ................. 709/203 |
| 6,347,398 B1 | | 2/2002 | Parthasarathy et al. |
| 6,477,550 B1 | * | 11/2002 | Balasubramaniam et al. .... 715/513 |
| 6,654,765 B2 | * | 11/2003 | Wong et al. ............. 707/103 R |
| 2002/0007357 A1 | | 1/2002 | Wong et al. |
| 2002/0129129 A1 | * | 9/2002 | Bloch et al. ................. 709/220 |
| 2002/0184499 A1 | * | 12/2002 | Taguchi et al. ............. 713/168 |

FOREIGN PATENT DOCUMENTS

| | | |
|---|---|---|
| WO | WO01/11466 | 2/2001 |
| WO | WO01/27824 | 4/2001 |
| WO | WO01/53937 | 7/2001 |

OTHER PUBLICATIONS

Field, Adam; Hartel, Peiter; Mooij, Wim; "Personal DJ, an Architecture for Personalised Content Delivery", p. 1-8, ACM May 2001, retrieved Mar. 1, 2005.*
Ludi, Stephanie; "Macromedia Director as a Prototyping and Usability Testing Tool", p. 1-7, Crossroads, vol. 6, Issue 5, Jul. 2000, ACM database, retrieved Mar. 1, 2005.*
Ganz, Aura; Savvides, Andreas; Ganz, Zvi; "Media Access Control Development Platform for Wireless LANs", p. 105-108, 1999 IEEE, retrieved Mar. 1, 2005.*
Flash TechNote, Using Flash movies in PowerPoint 2000, retrieved from google.com search □□<URL http://www.macromedia.com/cfusion/knowledgebase/index.cfm?id=tn_14235>□□retrieved Mar. 1, 2005.*
United States Patent Application entitled "Self-Exploding Micro-Installer", U.S. Appl. No. 09/514,857 filed on Feb. 28, 2000 (Related Application).

* cited by examiner

Primary Examiner—Mary Steelman (57) ABSTRACT

Various systems, methods, network pages, and programs embodied in a computer readable medium for automated content download and installation of an appropriate application on a client. In one embodiment, an installation system is provided that comprises a server coupled to a network and a network page maintained in the server and accessible by a client coupled to the network. The network page includes a link to a media element and a media actuator. The media actuator includes a link that provides for an execution of an installation plug-in to the client, the installation plug-in being adapted to perform an automated installation of an application in the client, the application being employed to render the media content.

14 Claims, 5 Drawing Sheets

AUTOMATED INSTALLATION OF AN APPLICATION

CROSS REFERENCE TO RELATED APPLICATIONS

This application is related to co-pending US Patent Application entitled "Secure Transmission and Installation of an Application," filed on even date herewith and accorded Ser. No. 10/134,830.

BACKGROUND

The Internet provides users with the ability to download content from remote web sites to a client device and display or otherwise interact with the content included therein. In many cases, special applications are necessary to view or interact with specific items of content such as, for example, Adobe Acrobat documents, Microsoft Paint documents, or video content, etc. In such cases, a user may attempt to download a content item only to discover that they do not have the required application on their client device to display or interact with the downloaded content item. It is then up to the user to download and install the required application. Unfortunately, it is estimated that up to 50% of downloads of all web applications fail for a number of reasons. Consequently, in such situations, the user is unable to access or otherwise enjoy the desired content.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
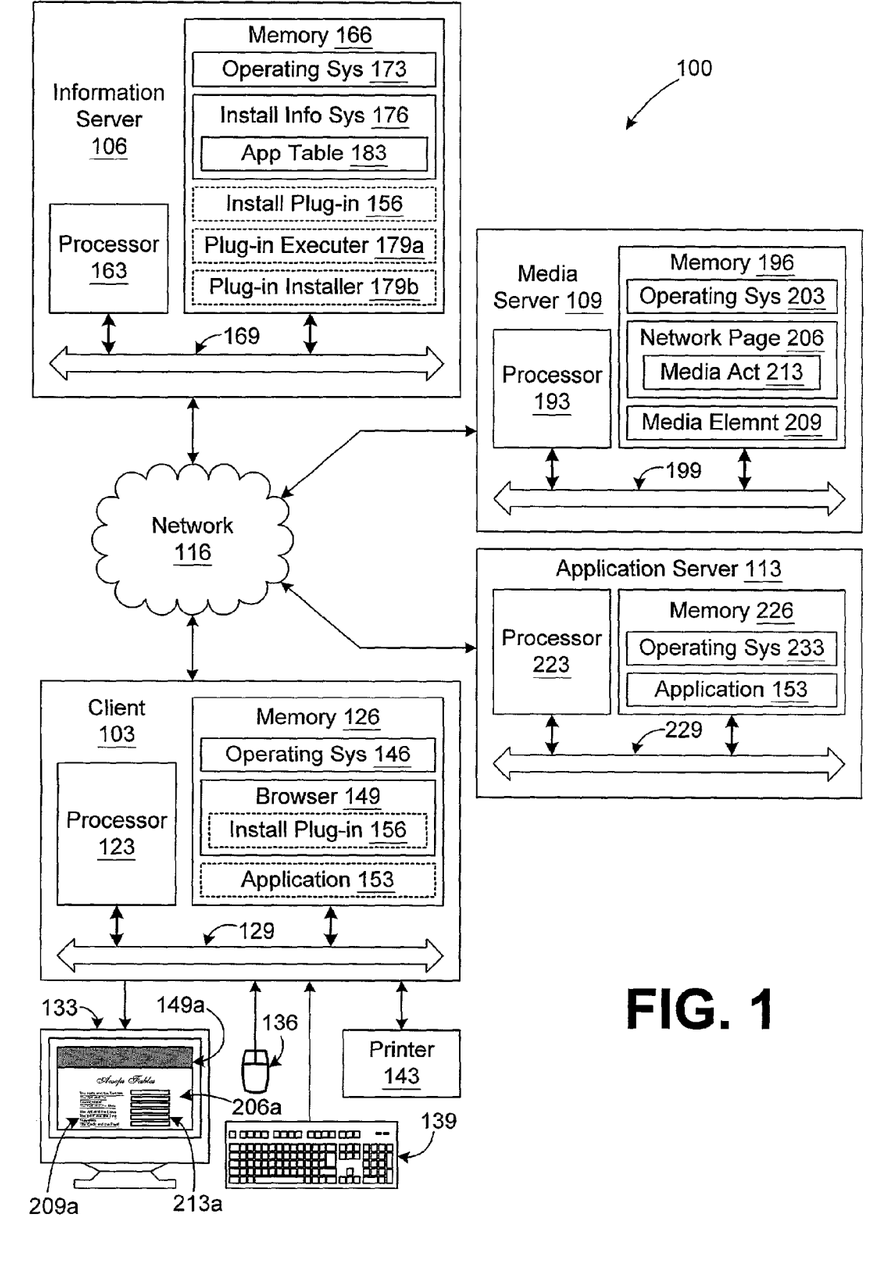
FIG. 1 is a drawing of a client/server network according to an embodiment of the present invention that includes devices that facilitate the automated installation of an application on a client.

With reference to FIG. 1, shown is a client/server network 100 according to an aspect of the present invention. The client/server network 100 includes a client 103, an information server 106, a media server 109, and an application server 113, all of which are coupled to a network 116. The network 116 may comprise, for example, the Internet, intranets, wide area networks (WANs), local area networks, wireless networks, or other suitable networks, etc., or any combination of two or more such networks. The client 103 and servers 106, 109, and 113 are coupled to the network 116 in one of any number of ways known by those with ordinary skill in the art so as to facilitate data communication to and from the network 116. In this respect, the client 103 and servers 106, 109, and 113 may be linked to the network 116 through various devices such as, for example, network cards, modems, routers, or other such communications devices, etc.

The various devices included in the client/server network 100 facilitate an automated installation of an application onto the client 103 over the network 116 according to the present invention. Before a detailed discussion of the operation of the various devices in the client/server network 100, first a detailed description of the physical aspects of the various devices is provided. Thereafter, the operation of the various devices in facilitating an automated installation of the application on the client 103 over the network 116 is provided.

The client 103 comprises a computer system or other device with like capability. In this respect, the client 103 includes a processor circuit with a processor 123 and a memory 126, both of which are coupled to a local interface 129. The local interface 129 may be, for example, a data bus with an accompanying control/address bus, as is generally known by those with ordinary skilled in the art. The client 103 includes a display device 133, a mouse 136, a keyboard 139, and a printer 143. Other peripheral devices that may be employed with the client 103 may include, for example, a keypad, touch pad, touch screen, microphone, scanner, joystick, or one or more push buttons, etc. The peripheral devices may also include indicator lights, speakers, etc. The display device 133 may be, for example, a cathode ray tube (CRT), liquid crystal display screen, gas plasma-based flat panel display, or other type of display device, etc. The client 103 is representative of a multitude of client devices that are coupled to the network 116 as can be appreciated by those with ordinary skill in the art.

The information server 106, media server 109, and application server 113 may each include various peripheral devices similar to those as was described with the client 103, as can be appreciated by those with ordinary skilled in the art.

The client 103 also includes a number of software components that are stored in the memory 126 and are executable by processor 123. These software components include an operating system 146, a browser 149, and an application 153 that is installed onto the client 103 as will be discussed. During the course of an installation of the application 153 on the client 103, the browser 149 may be instructed to implement an installation plug-in 156 as will be discussed. The installation plug-in may be, for example, a browser plug-in, an ACTIVEX™ control or other program. In this respect, the application 153 is installed onto the client 103 and may not originally exist on the client 103. When executed, the browser 149 generates a browser graphical user interface (GUI), such as exemplary GUI 149a, on the display device 133 as can be appreciated by those with ordinary skill in the art.

The information server 106 may also be a computer system or other like device that includes a processor circuit with a processor 163 and a memory 166, both of which are coupled to a local interface 169. The local interface 169 may be, for example, a data bus with accompanying control/address bus, as can be appreciated by those with ordinary skilled in the art. The information server 106 includes several software components that are stored in the memory 166 and are executable by the processor 163. These components include an operating system 173, an installation information system 176, an installation plug-in 156, a plug-in executor 179a, and a plug-in installer 179b. The installation information system 176 includes an application table 183. The installation plug-in 156, installation information system 176, and plug-in installer 179b are employed during the process of installing the application 153 onto the client 103 as will be described. The plug-in executor 179a is employed to execute the installation plug-in 156 when it was previously installed on the client 103 as will also be described.

The client server network 100 also includes a media server 109 that may be a computer system or other device with like capability. In this respect, the media server 109 includes a processor circuit with a processor 193 and a memory 196, both of which are coupled to a local interface 199. The local interface 199 may be, for example, a data bus with an accompanying control/address bus, as is generally known by those with ordinary skilled in the art. The media server 109 includes software components that are stored on the memory 196 and are executable by the processor 193 such as, for example, the operating system 203. The media server 109 also includes a network page 206 and a media element 209. The network page 206 may be, for example, a web page that is expressed in hypertext markup language (HTML) or extensible markup language (XML) or other markup language as is appropriate. Alternatively, other languages beyond markup languages may be employed to generate the network page 206 as is appropriate.

The network page 206 includes a media actuator 213 that includes various functionality that is implemented to install the application 153 on the client 103, as will be described. In this respect, the browser 149 on the client 103 may access the network page 206 and display the network page on the display device as the rendered network page 206a. In this respect, the media server 109 also includes server software that facilitates the download of the network page 206 and/or the media element 209 to the client 103 over the network 116, according to a suitable protocol such as, for example, hypertext transfer protocol (HTTP) or other suitable protocol, as is generally known by those with ordinary skilled in the art. In rendering the network page 206, the browser 149 also generates a graphical media actuator 213a or other actuator and media element links 209a on the display device 133 as appropriate. The media element links 209a may be, for example, hyperlinks or other regions of the rendered web page responsive to user input or direction.

The media element 209 may be any type of document or other file such as, for example, a video file, an audio file, a macromedia flash file, an image file, a slide show, a Virtual Reality Modeling Language (VRML) file, or some other multimedia file, document, or other media.

The client server network 100 also includes the application server 113 upon which the application 153 is located and made accessible to the client 103. In this respect, the application server 113 may be a computer system or other device of like capability. The application server 113 thus includes a processor circuit with a processor 223 and a memory 226, both of which are coupled to the local interface 229. The local interface may be, for example, a data bus with an accompanying control/address bus, as is generally known by those with ordinary skilled in the art.

The application server 113 includes an operating system 233 that is stored on the memory 226 and is executable by the processor 223. The application 153 is also stored on the memory 226 and is made available for download over the network 116 to clients 103. In this respect, the application server 113 also includes server software similar to that of the media server 109 that facilitates the download of the application 153 to the client 103 over the network 116.

While separate servers 106, 193, and 223 are shown coupled to the network 116, it is understood that the various components within each of these servers is portable and can be combined onto a single server or dispersed among a different distribution of servers as can be appreciated by one with ordinary skill in the art.

Each of the memories 126, 166, 196, and 226 are defined herein as both volatile and nonvolatile memory and data storage components. Volatile components are those that do not retain data values upon loss of power. Nonvolatile components are those that retain data upon a loss of power. Thus, each of the memories 126, 166, 196, and 226 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 123, 163, 193, and 223 may represent multiple processors and each of the memories 126, 166, 193, and 223 may represent multiple memories that operate in parallel processing circuits, respectively. In such a case, each of the local interfaces 129, 169, 199, and 229 may be an appropriate network that facilitates communication between any two of the multiple processors, between any processor and any of the memories, or between any two of the memories, etc. The processors 123, 163, 193, and 223 may be electrical or optical in nature.

Each of the operating systems 146, 173, 203, and 233 are executed to control the allocation and usage of hardware resources in the client 103, and servers 106, 109, 113 such as the memory, processing time and peripheral devices. In this manner, each of the operating systems 146, 173, 203, and 233 serve as the foundation on which applications depend as is generally known by those with ordinary skill in the art.

Next, the discussion of the operation of the various components of the client/server network 100 is provided to illustrate the operation of the present invention. To begin, assume that a user of the client 103 manipulates the browser 149 to download the network page 206 from the media server 109. The network page 206 includes a link to the media element 209. Also assume that the client 103 lacks the application 153 that is needed to render the media element 209. The term "render" as employed herein is defined as performing the tasks that accomplish a presentation of a media element 209 in a manner that is understandable to a user. In this respect, the act of rendering may be, for example, display or printing of text or images, playback of audio files and any other task that accomplishes a presentation to a user.

Since the client 103 lacks the application 153 to render the media element 209, the user needs to install the application 153 that is necessary to perform the desired rendering on the client 103. To accomplish this, the user clicks on the media actuator 213a that is depicted on the display device 133 as a portion of the network page 206a in order to automatically install the application 153 onto the client 103 with which to render the media element 209. The functionality of the media actuator 213 is performed when the media actuator 213a is manipulated by the user. In this respect, the media actuator 213a acts as a trigger mechanism that is displayed on the display device 133 and is operated by a user interacting with the rendered media actuator 213a.

The media actuator 213 associated with the network page 206 includes logic or code such as, for example, an ACTIVEX™ control, JAVASCRIPT™ or Visual Basic Script (VBScript) that detects whether the installation plug-in 156 is already installed on the client 103. When executed, the media actuator 213 determines whether the installation plug-in 156 is currently installed in the client 103. If the installation plug-in is so installed, the media actuator 213 downloads a lug-in executor 179a from the information server 106 that executes the installation plug-in 156 and monitors the progress of a resulting download and installation of the application 153 onto the client 103. The plug-in executor 179a may provide and indication on the display device 133 for example, as to the progress of the resulting download and installation of the application 153 onto the client 103.

Alternatively, if the media actuator 213 determines that the installation plug-in 156 is not installed in the client 103, then the media actuator 213 downloads a plug-in installer 179b from the information server 106. The plug-in installer 179b then downloads the installation plug-in 156 from the information server 106 and then installs and executes the installation plug-in 156 in the client 103. In this respect, the plug-in installer 179b includes a uniform resource identifier (URI) of the installation plug-in 156 to facilitate the downloading thereof. The plug-in installer 179b also monitors progress in installing the application 153 and may indicate such progress on the display device 133. In executing the installation plug-in 156, the plug-in executor 179a and/or the plug-in installer 179b may direct the browser 149 to execute the installation plug-in 156, or some other approach may be employed.

The media actuator 213 uses a script containing a link to the plug-in executor 179a and a link to the plug-in installer 179b in order to download either the plug-in executor 179a or the plug-in installer 179b. In this regard, the media actuator 213 facilitates either the execution or the download, installation, and execution of the installation plug-in 156.

When executing the installation plug-in 156, either the plug-in executor 179a or the plug-in installer 179b provides an application identifier to the installation plug-in 156. The application identifier is associated with the corresponding application 153 to be installed on the client 103 for rendering the media element 209. In this respect, the application identifier may be, for example, a file extension of the media element 209, a file name and version of the application 153, or a nickname that represents the desired version of the application 153 in the information server 106. Also, a combination of all of these parameters may be supplied as well. In addition, the media actuator 213 provides a uniform resource identifier (URI) of the media element 209 to the installation plug-in 156 to be employed to download the media element 209.

Upon being executed in the client 103, the installation plug-in 156 generates a secure request that is to be transmitted to the installation information system 176 in the information server 106 for the application 153. The installation plug-in 156 includes the application identifier in the secure request to inform the installation information system 176 precisely which application 153 is desired. The secure request is a request to the installation information system 176 for the uniform resource identifier (URI) that identifies the location of the application 153 on the network 116. The secure request may be created using any appropriate secure transmission protocol or mechanism such as, for example, hypertext transfer protocol secure (HTTPS). Also, various encryption and authentication systems may be employed as well as can be appreciated by those with ordinary skill in the art. In addition, all other transmissions described herein may be secure transmissions beyond the secure request generated by the installation plug-in 156.

The information server 106 receives the secure request and communicates it to the installation information system 176 for processing. In this regard, the act of "receiving" data in a respective device entails accepting the data from the network 116 and storing the data in a memory associated with the device for further processing. Next, the installation information system 176 consults the application table 183 to look up the application 153 associated with the application identifier. In this respect, the application table 183 includes information that maps the respective application identifiers to the uniform resource identifiers of the applications 153. The application table 183 also maps the application identifiers to a hash total that is associated with the respective application 153.

The hash total is calculated from the application 153 and is used as an authentication device to ensure that the application 153 is the application desired in the client 103. Specifically, the hash total is calculated from the application 153 using an appropriate hash system. For example, a hash total may be an MD5 hash or equivalent. Once the installation information system 176 obtains the uniform resource identifier and the corresponding hash total associated with the application 153, the installation information system 176 then generates a secure response that includes the application uniform resource identifier and the hash total and sends the same to the client 103. In another embodiment, the request and response above may not be secure transmissions.

Upon receiving the uniform resource identifier and hash total associated with a desired application 153, the installation plug-in 156 then transmits a request for the application 153 using the uniform resource indicator of the application 153. The uniform resource identifier identifies the location of the application 153 on the application server 113. In response, the application server 113 transmits an installation version of the application 153 to the client 103. The installation version of the application 153 is supplied in a form that can then be installed on the client 103 and is also known as an "installer" as can generally be appreciated by those with ordinary skilled in the art. Upon receiving the installer of the application 153, the installation plug-in 156 may then verify that the installer of the application 153 is authentic by calculating a hash total therefrom, although this verification step may be skipped if deemed unnecessary.

Assuming verification is performed, the installation plug-in 156 may execute a hash calculation system to produce a hash total. This hash calculation system is the same as the hash calculation system that was employed to generate the hash total stored in the application table 153 in the information server 106. This newly generated hash total may then be compared with the hash total received from the installation information system 176 to determine whether the installer of the application 153 is authentic.

Assuming that the installer of the application 153 is authentic, the installation plug-in 156 then executes an installation of the application 153 onto the client 103. In doing so, the installation plug-in 156 may cause one or more GUIs to be displayed on the display device 133 that informs the user of the status of the installation process. Alternatively, the plug-in executor 179a or installer 179b may inform a user as to the progress of the installation process as was previously mentioned. During the course of the installation of the application 153, a user may be instructed to perform one or more tasks, including, for example, shutting down all open applications on the client 103 so as to ensure a proper installation takes place, as can be appreciated by those with ordinary skill in the art.

Thereafter, assuming that the application 153 has been successfully installed in the client 103, the installation plug-in 156 downloads the media element 209 from the media sever 109. Once the media element 209 is received in the client 103, the installation plug-in 156 proceeds to execute the application 153 and render the media element 209.

If any failure occurs during the course of the operation of the installation plug-in 156 such as the fact that any expected response to a request was not received when expected or other error occurs, the installation plug-in 156 will generate a GUI on the display device 133 that informs the user of such error. In such situations, the installation of the application 153 and/or rendering of the media element 209 in the client 103, is typically aborted.

Figure 2:
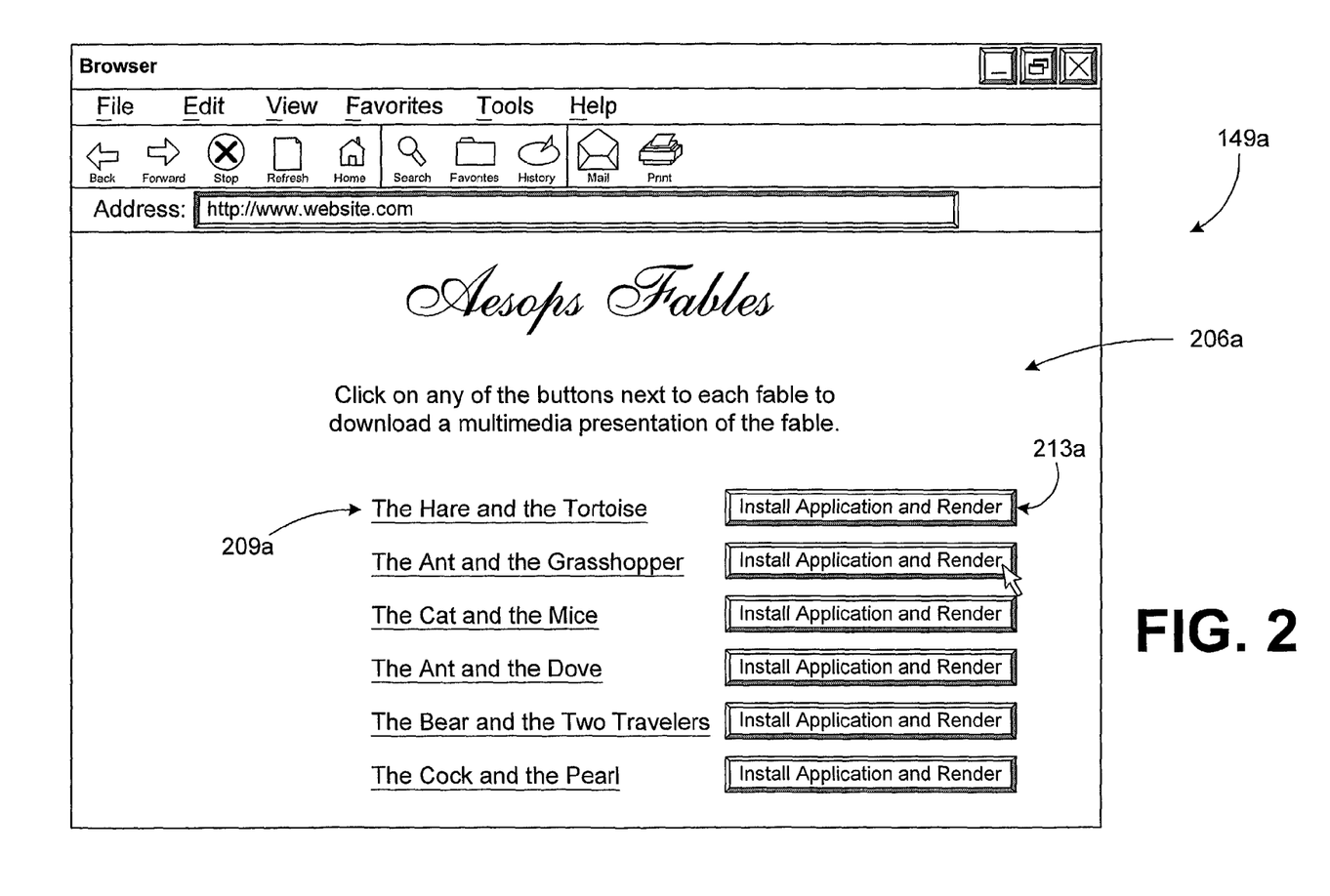
FIG. 2 is a drawing of an exemplary graphical user interface corresponding to an exemplary network page depicted on a display device of the client in the client/server network of FIG. 1.

With reference to FIG. 2, shown is an exemplary browser GUI 149a that is generated on the display device 133 (FIG. 1) according to an aspect of the present invention. As shown, the browser GUI 149a depicts the network page 206a with a number of media element links 209a that reference to one or more media elements 209 (FIG. 1) stored on the media server 109 (FIG. 1) or on another server coupled to the network 116 (FIG. 1). In this respect, the media element links 209a may comprise, for example, hypertext links or other links or addresses. It is understood, however, that the content of the browser GUI 149a is merely exemplary where other graphical elements may be employed, etc. If the user were to interact with the GUI so as to click on one of the media element links 209a and the application 153 (FIG. 1) was not installed on the client 103 (FIG. 1), then any media element 209 downloaded to the client 103 could not be rendered.

If this were the case, then the user may click on the media actuator 213 that is associated with the media element link 209a and correspondingly associated with the media element 209. In this manner, not only is the media element 209 downloaded, but the application 153 necessary to render the media element 209 is also downloaded and installed on the client 103. Thereafter, the installed application 153 is executed and the media element 209 is automatically rendered without further user input. In some situations, the user may be prompted to perform various tasks during the installation of the application 153 such as, for example, closing all open applications on the client 103, etc.

Figure 3:
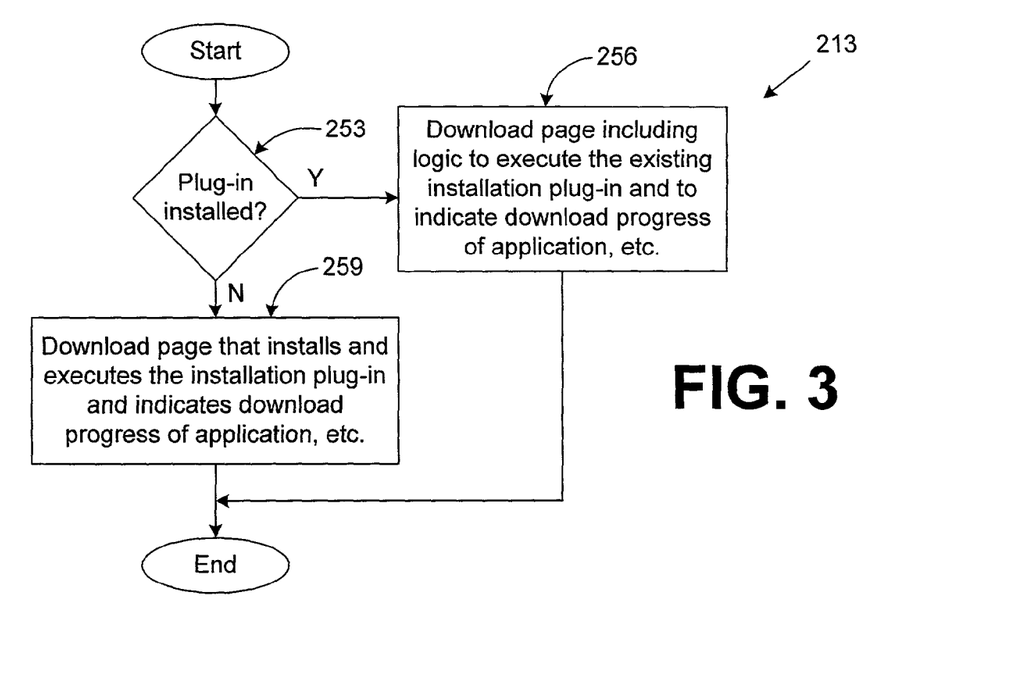
FIG. 3 is a flow chart describing the operation of a media actuator according to an embodiment of the present invention executed in the client in the client/server network of FIG. 1.

With respect to FIG. 3, shown is a flowchart describing the operation of the media actuator 213, according to an embodiment of the present invention. Alternatively, the flowchart of FIG. 3 may be viewed as depicting steps in a method associated with the media actuator 213 and implemented in the client 103 (FIG. 1).

Beginning with box 253, upon being executed by a user's clicking on the media actuator 213a (FIG. 2), the media actuator 213 first determines whether the installation plug-in 156 (FIG. 1) exists in the client 103. If so, then the media actuator 213 proceeds to box 256. Otherwise, the media actuator 213 jumps to box 259.

In box 256, the media actuator 213 downloads the plug-in executor 179a that may be incorporated, for example, into a web page. The plug-in executor 179a is then executed to execute a previously downloaded installation plug-in 156. In addition, in box 256 the media actuator 213 indicates the application download progress and the download progress of the media element 209 to the user. Thereafter, the media actuator 213 ends.

In box 259, the media actuator 213 downloads the plug-in installer 179b that may be incorporated, for example, into a web page. The plug-in installer 179b is then executed to download, install, and execute the installation plug-in 156. In addition, in box 259 the media actuator 213 indicates the application download progress and the download progress of the media element 209 to the user. Thereafter, the media actuator 213 ends.

Figure 4A:
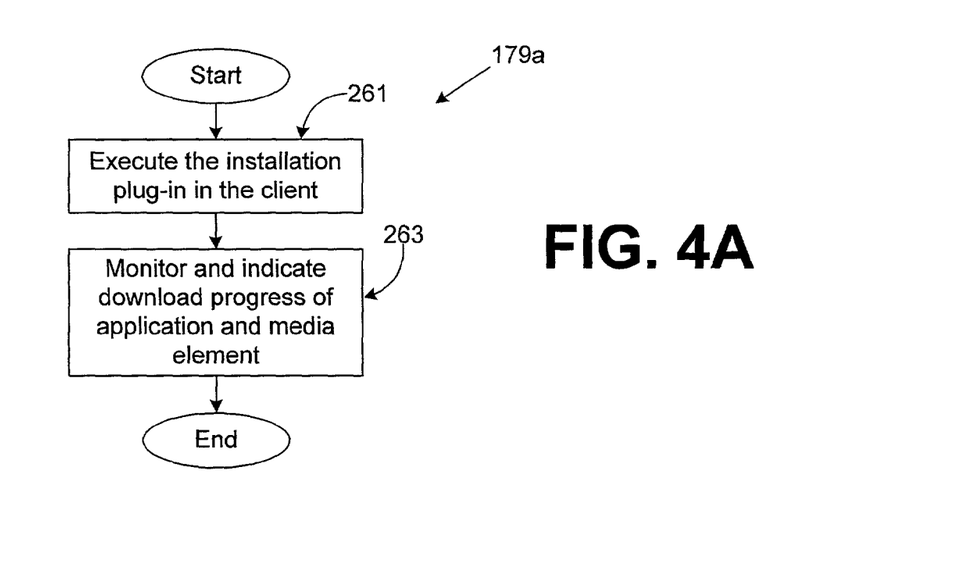
FIG. 4A is a flow chart describing the operation of a plug-in executer according to an embodiment of the present invention executed in the client in the client/server network of FIG. 1 that executes the application of FIG. 1 that was previously installed on the client.

Referring next to FIG. 4A, shown is a flowchart of the operation of the plug-in executor 179a according to an embodiment of the present invention. Alternatively, the flowchart of FIG. 4A may be viewed as depicting steps in a method implemented in the client 103 (FIG. 1) according to an aspect of the present invention in order to execute the installation plug-in 156 in the client 103. The plug-in executor 179a may be created, for example, using Hypertext Markup Language (HTML) and logic or code such as, for example, an ACTIVEX™ control, JAVASCRIPT™, Visual Basic Script (VBScript), or other language.

Beginning with box 261, the plug-in executor 179a first executes the existing installation plug-in 156 in the client 103. In doing so, the plug-in executor 179a may provide the application identifier and the uniform resource identifier of the media element 209 to the installation plug-in 156, such information having been provided by the media actuator 213. Alternatively, such information may be provided by the media actuator 213 directly to the installation plug-in 156 itself. Thereafter, in box 263, the plug-in executor 179a monitors the download progress of the application 153 (FIG. 1) and the media element 209 (FIG. 1) in the client 103 and may indicate such progress on the display device 133. Alternatively, such indication may be generated by the installation plug-in 156 itself.

Figure 4B:
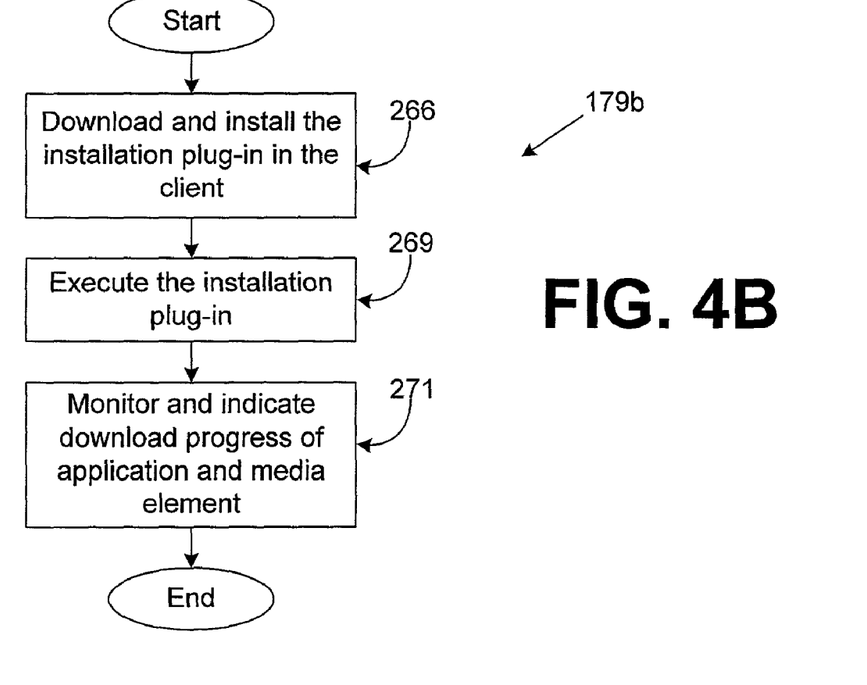
FIG. 4B is a flow chart describing the operation of a plug-in installer according to an embodiment of the present invention executed in the client in the client/server network of FIG. 1 that initiates an installation and execution of the application on the client.

Referring next to FIG. 4B, shown is a flowchart of the operation of the plug-in executor 179b according to an embodiment of the present invention. Alternatively, the flowchart of FIG. 4B may be viewed as depicting steps in a method implemented in the client 103 (FIG. 1) according to an aspect of the present invention in order to download the installation plug-in 156 from the information server 106, and install and execute it in the client 103. The plug-in installer 179b may be created, for example, using Hypertext Markup Language (HTML) and logic or code such as, for example, an ACTIVEX™ control, JAVASCRIPT™, Visual Basic Script (VBScript), or other language.

Beginning with box 266, the plug-in installer 179b downloads the installation plug-in 156 from the information server 106 and installs it in the client 103. Thereafter, in box 269 the plug-in installer 179b executes the installation plug-in 156 in the client 103. In doing so, the plug-in installer 179b may provide the application identifier and the uniform resource identifier of the media element 209 to the installation plug-in 156, such information having been provided by the media actuator 213. Alternatively, such information may be provided by the media actuator 213 directly to the installation plug-in 156 itself. Thereafter, in box 263, the plug-in installer 179b monitors the download and execution progress of the application 153 (FIG. 1) in the client 103 and may indicate such progress on the display device 133. Alternatively, such indication may be generated by the installation plug-in 156 itself.

Figure 5:
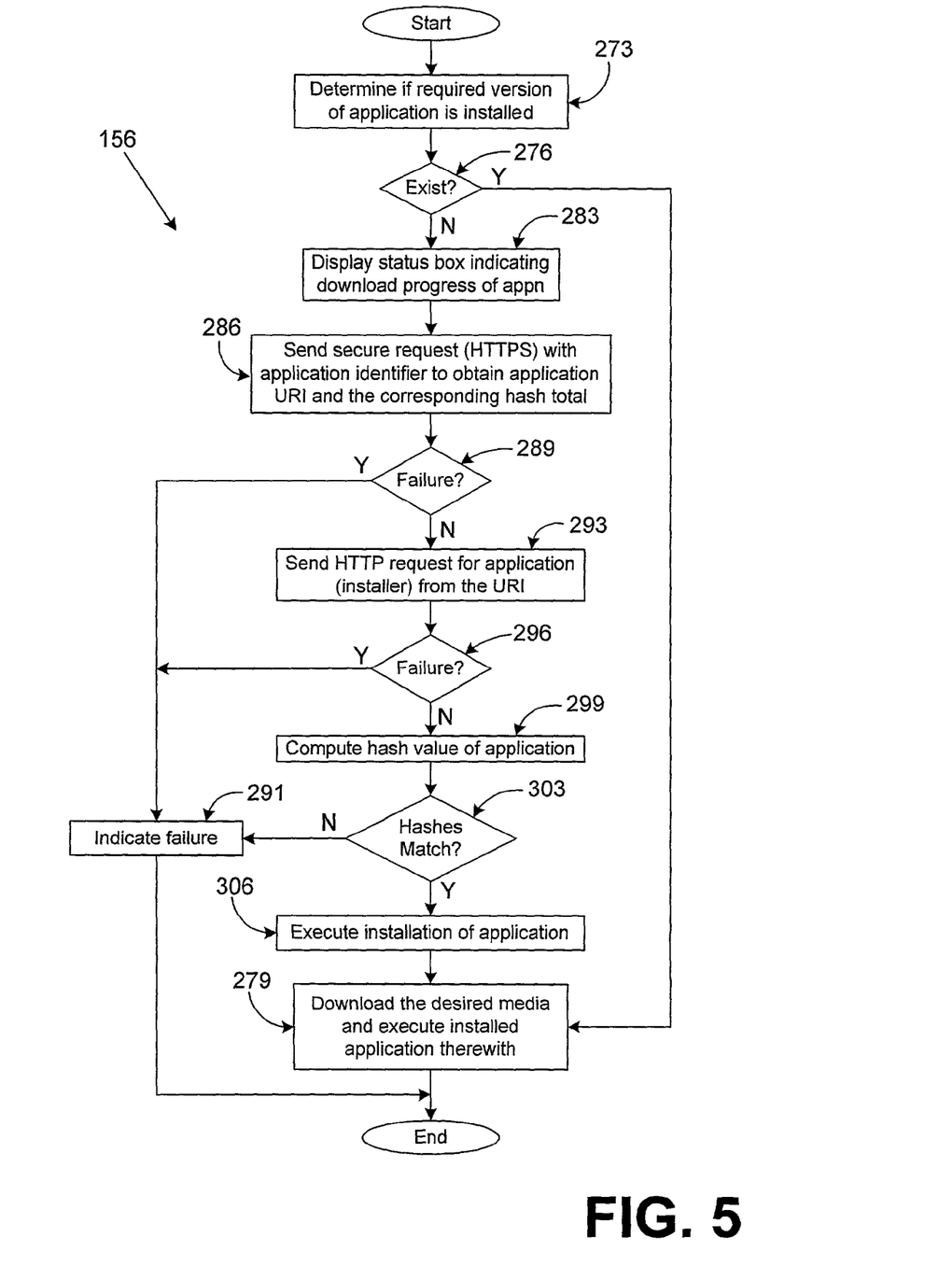
FIG. 5 is a flow chart of an installation plug-in according to an embodiment of the present invention executed in the client in the client/server network of FIG. 1.

With reference to FIG. 5, shown is a flowchart of the operation of the installation plug-in 156 according to an embodiment of the present invention. Alternatively, the flowchart of FIG. 5 may be viewed as depicting steps in a method implemented in the client 103 (FIG. 1) according to an aspect of the present invention in order to install an application 153 (FIG. 1) onto the client 103 to render a media element 209 (FIG. 1).

Beginning with box 273, assuming that the installation plug-in 156 has been downloaded and installed onto the client 103 and is executed by the browser 140, the installation plug-in 156 first determines if the required version of the application 153 is installed on the client 103. The specific version of the application may be any version that is compatible with or capable of rendering the media element 209. Thereafter, in box 276, if the required version of the application 153 is installed, then the installation plug-in 156 jumps to box 279, otherwise, the installation plug-in 156 proceeds to box 283. In box 283, a status box indicating the download progress of the application 153 is displayed on the display device 133 (FIG. 1). In addition, the status of the installation progress of the application 153 onto the client 103 may also be depicted in the status box or in a different status box as can be appreciated by those with ordinary skilled in the art.

Next, in box 286, a secure request is generated and transmitted to the installation information system 176 (FIG. 1) in the information server 106 (FIG. 1). The application identifier is included in the secure request. Thereafter, in box 289, the installation plug-in 156 waits to receive the secure response from the installation information system 176 in the information server 106. If a time out period tolls before a secure response is received, then the installation plug-in 156 assumes that an error has occurred and proceeds to box 291 where an error or failure indication is generated on the display device 133. This informs the user that the installation of the application 153 has failed and the media element 209 cannot be rendered on the client 103. Thereafter, the installation plug-in 156 ends.

However, if in block 289 the secure response is received from the installation information system 176, then the installation plug-in 156 proceeds to box 293 in which a request is transmitted to the application server 113 for the application 153 using an appropriate communications protocol, such as HTTP, etc. The actual file obtained from the application server 113 is an installer version of the application 153 that may be implemented during the installation of the application 153 on the client 103. The request is transmitted to the uniform resource indicator of the application 153 that was previously obtained from the installation information system 176 in box 289.

Then, in box 296, the installation plug-in 156 waits to receive the application 153 from the application server 113 in response to the request. If a predetermined time period tolls without receiving the application, then the installation plug-in 156 assumes than an error has occurred and proceeds to box 291 to inform the user of the error on the display device 133. On the other hand, assuming that the install version of the application 153 is received from the application server 113 in box 296, in box 299 the installation plug-in 156 computes the hash value of the install version of the application 153. Then, in box 303, if the hash total calculated from the install version of the application 153 matches the hash total received from the application server 113 in response to the request sent in box 296, the installation plug-in 156 proceeds to box 306. Otherwise the installation plug-in 156 moves to box 291 to indicate a failure to install the application 153 on the display device 113.

Assuming that the hash totals match in box 303, then in box 306 the installation plug-in 156 performs the installation of the application 153 in the client 103. In doing so, the installation plug-in 156 may execute, for example, an installer associated with the application 153. Thereafter, in box 279, the desired media element 209 is downloaded from the media server 109 and the application 153 is executed therewith. In this manner, the media element 209 is rendered for the user. Thereafter, the installation plug-in 156 ends.

Figure 6:
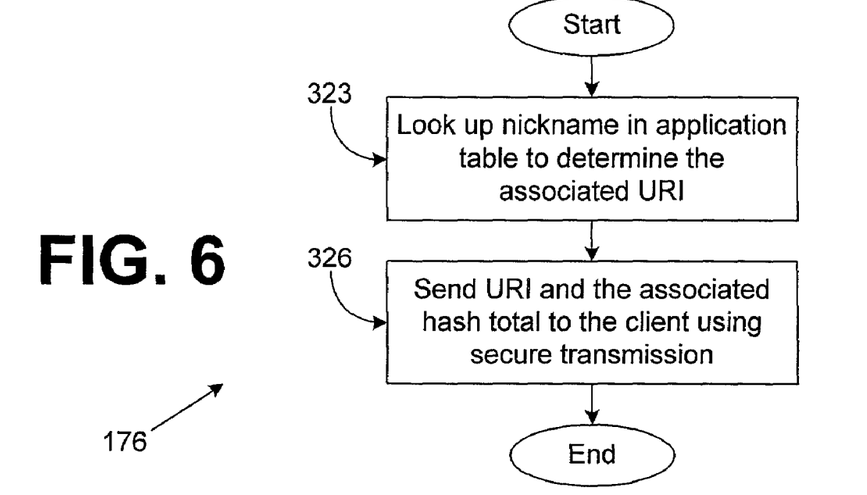
FIG. 6 is a flow chart of an installation information system according to an embodiment of the present invention executed in an information server in the client/server network of FIG. 1.

With reference to FIG. 6, shown is a flowchart of the operation of the installation information system 176 that is implemented on the information server 106 (FIG. 1) according to another aspect of the present invention. Alternatively, the flowchart of FIG. 6 may be viewed as depicting steps of a method implemented in the information server 106. Beginning with box 323, the installation information system 176 looks up the application identifier in the application table 183 (FIG. 1) to determine the associated uniform resource identifier of the application 153, as well as the hash total associated therewith. Thereafter, in box 326 a secure response is generated that includes the uniform resource identifier of the application 153 and the corresponding hash total. The secure response is then transmitted to the client 103. Thereafter, the installation information system 176 ends.

Although the media actuator 213, installation plug-in 156, and the installation information system 176 and other logic of the present invention are embodied in software or code executed by general purpose hardware as discussed above, as an alternative the same may also be embodied in dedicated hardware or a combination of software/general purpose hardware and dedicated hardware. If embodied in dedicated hardware, the media actuator 213, installation plug-in 156, the installation information system 176, and other logic described herein can each be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 3, 4A–B, 5 and 6 show the architecture, functionality, and operation of an implementation of the media actuator 213, installation plug-in 156, the installation information system 176, and other logic. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 3, 4A–B, 5 and 6 show a specific order of execution, it is understood that the order of execution may differ from that which is depicted. For example, the order of execution of two or more blocks may be scrambled relative to the order shown. Also, two or more blocks shown in succession in FIGS. 3, 4A–B, 5 and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the media actuator 213, installation plug-in 156, or the installation information system 176 comprises software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the media actuator 213, installation plug-in 156, and the installation information system 176 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

We claim:

1. A program embodied in a computer readable medium for automated installation of an application for rendering data, said program comprising:

code that detects whether an installation plug-in is installed in a computer system, the installation plug-in being adapted to perform an automated installation of an application in the computer system in which the application is not installed, the application being operative to render data via the computer system;

code that downloads a plug-in executor from at least one remote server if the installation plug-in is detected as being installed in the computer system, the plug-in executor automatically executing the installation plug-in already installed in the computer system, the plug-in executor providing an application identifier to the installation plug-in that identifies the application that renders the data;

code that downloads a plug-in installer from the at least one remote server if the installation plug-in is not detected as being installed in the computer system, the plug-in installer automatically downloading, installing, and executing the installation plug-in in the computer system, the plug-in installer providing the application identifier to the installation plug-in that identifies the application that renders the data;

wherein the installation plug-in employs the application identifier to automatically download the application from the at least one remote server and automatically installs the application in the computer system such that the application is enabled to render data via the computer system.

2. The program embodied in the computer readable medium of claim 1, further comprising:

code that generates a trigger mechanism on a graphical user interface; and code that initiates the detection of the presence of the installation plug-in in response to user activation of the trigger mechanism.

3. The program embodied in a computer readable medium of claim 1, wherein the plug-in installer further comprises a uniform resource identifier that identifies a location of the installation plug-in on the remote server.

4. An installation system, comprising:

at least one server coupled to a network;

a network page maintained in the at least one server and accessible by a client coupled to the network, the network page including a first link to a media element;

a media actuator in the network page, the media actuator being configured to:

detect whether an installation plug-in is installed in the client, the installation plug-in being adapted to perform an automated installation of an application in the client in which the application is not installed, the application being operative to render data via the client;

download a plug-in executor from at least one remote server if the installation plug-in is detected as being installed in the client, the plug-in executor automatically executing the installation plug-in already installed in the client, the plug-in executor providing an application identifier to the installation plug-in that identifies the application that renders the data; and download a plug-in installer from the at least one remote server if the installation plug-in is not detected as being installed in the client, the plug-in installer automatically downloading, installing, and executing the installation plug-in in the client, the plug-in installer providing the application identifier to the installation plug-in that identifies the application that renders the data;

wherein the installation plug-in employs the application identifier to automatically download the application from the at least one remote server and automatically installs the application in the client such that the application is enabled to render data via the client.

5. The installation system of claim 4, wherein the application identifier further comprises a file extension of the media element.

6. The installation system of claim 4, wherein the application identifier further comprises a name of the application and a version of the application.

7. The installation system of claim 4, wherein the application identifier further comprises a nickname associated with the application.

8. A network page embodied in a computer readable medium to be downloaded to a client, comprising:

a first link to a media element to be rendered on the client by an application; and a media actuator configured to:

detect whether an installation plug-in is installed in the client, the installation plug-in being adapted to perform an automated installation of an application in the client in which the application is not installed, the application being operative to render data via the client;

download a plug-in executor from at least one remote server if the installation plug-in is detected as being installed in the client, the plug-in executor automatically executing the installation plug-in already installed in the client, the plug-in executor providing an application identifier to the installation plug-in that identifies the application that renders the data; and download a plug-in installer from the at least one remote server if the installation plug-in is not detected as being installed in the client, the plug-in installer automatically downloading, installing, and executing the installation plug-in in the client, the plug-in installer providing the application identifier to the installation plug-in that identifies the application that renders the data;

wherein the installation plug-in employs the application identifier to automatically download the application from the at least one remote server and automatically installs the application in the client such that the application is enabled to render data on the client.

9. The network page embodied in a computer readable medium of claim 8, wherein the media element is selected from the a group consisting of a document, a video file, an image file, a slide show, and a virtual reality modeling language (VMRL) file.

10. An automated installation method, comprising:

detecting whether an installation plug-in is installed in a computer system, the installation plug-in being adapted to perform an automated installation of an application in the computer system in which the application is not installed, the application being operative to render date via the computer system;

downloading a plug-in executor from at least one remote server if the installation plug-in is detected as being installed in the computer system, the plug-in executor automatically executing the installation plug-in already installed in the computer system, the plug-in executor providing an application identifier to the installation plug-in that identifies the application that renders the data;

downloading a plug-in installer from the at least one remote server if the installation plug-in is not detected as being installed in the computer system, the plug-in installer automatically downloading, installing, and executing the installation plug-in in the computer system, the plug-in installer providing the application identifier to the installation plug-in that identifies the application that renders the data; and using the application identifier in conjunction with the execution of the installation plug-in to automatically download the application from the at least one remote server and automatically installs the application in the computer system such that the application is enabled to render data on the computer system.

11. The automated installation method of claim 10, further comprising:

generating a trigger mechanism on a display device; and implementing the detection of the presence of the installation plug-in upon a manipulation of the trigger mechanism by a user.

12. The automated installation method of claim 10, further comprising providing a uniform resource identifier that identifies a location of the installation plug-in on a network.

13. An automated installation system, comprising:

a network page rendered by a computer system, the network page including a media element that is rendered by the computer system by an application if the application is installed on the computer system;

means for detecting whether an installation plug-in is installed in the computer system if the application is not installed in the computer system, the installation plug-in being adapted to perform an automated installation of the application in the computer system;

means for downloading a plug-in executor from at least one remote server if the installation plug-in is detected as being installed in the computer system, the plug-in executor automatically executing the installation plug-in already installed in the computer system, the plug-in executor providing an application identifier to the installation plug-in in that identifies the application;

means for downloading a plug-in installer from the at least one remote server if the installation plug-in is not detected as being installed in the computer system, the plug-in installer automatically downloading, installing, and executing the installation plug-in in the computer system, the plug-in installer providing the application identifier to the installation plug-in that identifies the application; and means for using the application identifier in conjunction with the execution of the installation plug-in to automatically download the application from the at least one remote server and automatically install the application in the computer system such that the application is enabled to render the media element on the computer system.

14. The automated installation system of claim 13, further comprising:

means for generating a trigger mechanism on a display device; and means for implementing the detection of the presence of the installation plug-in upon a manipulation of the trigger mechanism by a user.

* * * * *

UNITED STATES PATENT AND TRADEMARK OFFICE
CERTIFICATE OF CORRECTION

PATENT NO. : 7,203,940 B2
APPLICATION NO. : 10/134766
DATED : April 10, 2007
INVENTOR(S) : James W. Barmettler et al.

It is certified that error appears in the above-identified patent and that said Letters Patent is hereby corrected as shown below:

On the Title page, in field (73), in "Assignee", in column 1, line 2, delete "LP." and insert -- L.P. --, therefor.

In column 2, line 57, after "by" insert -- the --.

In column 2, line 60, delete "on" and insert -- onto --, therefor.

In column 2, line 63, after "plug-in" insert -- 156 --.

In column 5, line 29, after "plug-in" insert -- 156 --.

In column 5, line 30, delete "lug-in" and insert -- plug-in --, therefor.

In column 5, line 34, delete "and" and insert -- an --, therefor.

In column 8, line 57, delete "executor" and insert -- installer --, therefor.

In column 13, line 53, in Claim 9, delete "the" before "a group".

In column 13, line 61, in Claim 10, delete "date" and insert -- data --, therefor.

In column 14, line 43, in Claim 13, after "plug-in" delete "in".

Signed and Sealed this

Eleventh Day of August, 2009

David J. Kappos
*Director of the United States Patent and Trademark Office*